(12) United States Patent
Harada et al.

(10) Patent No.: US 11,533,119 B2
(45) Date of Patent: Dec. 20, 2022

(54) USER TERMINAL AND RADIO COMMUNICATION METHOD

(71) Applicant: NTT DOCOMO, INC., Tokyo (JP)

(72) Inventors: Hiroki Harada, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/054,402

(22) PCT Filed: May 11, 2018

(86) PCT No.: PCT/JP2018/018365
§ 371 (c)(1),
(2) Date: Nov. 10, 2020

(87) PCT Pub. No.: WO2019/215921
PCT Pub. Date: Nov. 14, 2019

(65) Prior Publication Data
US 2021/0250115 A1 Aug. 12, 2021

(51) Int. Cl.
*H04J 11/00* (2006.01)
*H04W 72/04* (2009.01)

(52) U.S. Cl.
CPC ....... *H04J 11/0073* (2013.01); *H04J 11/0076* (2013.01); *H04W 72/042* (2013.01)

(58) Field of Classification Search
CPC ............. H04J 11/0073; H04J 11/0076; H04W 72/042; H04W 56/001; H04W 48/12
See application file for complete search history.

(56) References Cited

U.S. PATENT DOCUMENTS

2018/0124744 A1* 5/2018 Xue ...................... H04L 5/0064

OTHER PUBLICATIONS

International Search Report issued in PCT/JP2018/018365 dated Jul. 24, 2018 (2 pages).
Written Opinion of the International Searching Authority issued in PCT/JP2018/018365 dated Jul. 24, 2018 (4 pages).
3GPP TS 38.213 V15.1.0; "3rd Generation Partnership Project; Technical Specification Group Radio Access Network; NR; Physical layer procedures for control (Release 15)"; Mar. 2018 (77 pages).
ZTE, Sanechips; "Remaining details of NR-PBCH Design"; 3GPP TSG RAN WG1 Meeting #92, R1-1801405; Athens, Greece; Feb. 26-Mar. 2, 2018 (8 pages).

(Continued)

*Primary Examiner* — Shukri Taha
(74) *Attorney, Agent, or Firm* — Osha Bergman Watanabe & Burton LLP

(57) ABSTRACT

To appropriately perform notification control related to a synchronization raster position, one aspect of the user terminal according to the present disclosure includes: a reception section that receives a synchronization signal block including a first information element related to a subcarrier offset, and a second information element related to a downlink control channel for system information; and a control section that, when a given code point is indicated in the first information element, recognizes an absence of a control resource set for the system information associated with the synchronization signal block, and determines an information type to be notified based on a code point included in the second information element.

15 Claims, 11 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #92; R1-1802141 "Indication of cell-defining SS/PBCH block in PBCH" ETRI; Athens, Greece; Feb. 26-Mar. 2, 2018 (7 pages).
3GPP TSG-RAN WG1 meeting #92; R1-1802892 "On indication of valid locations of SS/PBCH with RMSI" Nokia, Nokia Shanghai Bell; Athens, Greece; Feb. 26-Mar. 2, 2018 (11 pages).
Extended European Search Report issued in European Application No. 18917674.6, dated Nov. 4, 2021 (13 pages).
Ericsson, "Remaining details of PBCH", 3GPP TSG RAN WG1 Meeting #92, R1-1802941, Athens, Greece, Feb. 26-Mar. 2, 2018 (3 pages).
Notice of Reasons for Refusal issued in Japanese Application No. 2020-517743 dated Jun. 21, 2022 (8 pages).
Office Action issued in Indonesian Application No. P00202009507 dated Jul. 15, 2022 (6 pages).

\* cited by examiner

FIG. 3A

| $k_{SSB}$ | RMSI-PDCCH-Config | $N_{GSCN}^{Offset}$ |
|---|---|---|
| 24 | 0, 1, ..., 255 | 1, 2, ..., 255 |
| 25 | 0, 1, ..., 255 | 257, 258, ..., 512 |
| 26 | 0, 1, ..., 255 | 513, 514, ..., 768 |
| 27 | 0, 1, ..., 255 | −1, −2, ..., −255 |
| 28 | 0, 1, ..., 255 | −257, −258, ..., −512 |
| 29 | 0, 1, ..., 255 | −513, −514, ..., −768 |
| 30 | 0, 1, ..., 255 | Reserved, Reserved, ..., Reserved |

FIG. 3B

| $k_{SSB}$ | RMSI-PDCCH-Config | $N_{GSCN}^{Offset}$ |
|---|---|---|
| 12 | 0, 1, ..., 255 | 1, 2, ..., 255 |
| 13 | 0, 1, ..., 255 | −1, −2, ..., −255 |
| 14 | 0, 1, ..., 255 | Reserved, Reserved, ..., Reserved |

FIG. 5A

| $k_{SSB}$ | RMSI-PDCCH-Config | $N_{GSCN}^{Offset}$ |
|---|---|---|
| 24 | 0, 1, ..., 255 | 1, 2, ..., 255 |
| 25 | 0, 1, ..., 255 | 257, 258, ..., 512 |
| 26 | 0, 1, ..., 255 | 513, 514, ..., 768 |
| 27 | 0, 1, ..., 255 | -1, -2, ..., -255 |
| 28 | 0, 1, ..., 255 | -257, -258, ..., -512 |
| 29 | 0, 1, ..., 255 | -513, -514, ..., -768 |
| 30 | 0, 1, ..., 255 | 0, Reserved, ..., Reserved |

FIG. 5B

| $k_{SSB}$ | RMSI-PDCCH-Config | $N_{GSCN}^{Offset}$ |
|---|---|---|
| 12 | 0, 1, ..., 255 | 1, 2, ..., 255 |
| 13 | 0, 1, ..., 255 | -1, -2, ..., -255 |
| 14 | 0, 1, ..., 255 | 0, Reserved, ..., Reserved |

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A or LTE Rel. 10, 11, 12 and 13) has been specified.

LTE successor systems (also referred to as, for example, Future Radio Access (FRA), the 5th generation mobile communication system (5G), 5G+(plus), New Radio (NR), New radio access (NX), Future generation radio access (FX) or LTE Rel. 14, 15 or subsequent releases) have been also studied.

In legacy LTE systems (e.g., LTE Rel. 8 to 13), a user terminal (UE: User Equipment) detects synchronization signals (a Primary Synchronization Signal (PSS) and/or a Secondary Synchronization Signal (SSS)) by an initial access procedure (also referred to as cell search), synchronizes with a network (e.g., a radio base station (eNB: eNode B)), and identifies a cell (i.e., identifies the cell based on, for example, a cell Identifier (ID)) to connect with.

Furthermore, after cell search, the UE receives a Master Information Block (MIB) transmitted on a broadcast channel (PBCH: Physical Broadcast Channel) or a System Information Block (SIB) transmitted on a Downlink (DL) shared channel (PDSCH: Physical Downlink Shared Channel), and obtains configuration information (that may be referred to as broadcast information or system information) for communicating with a network.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

It has been studied for a future radio communication system (e.g., NR or 5G) to define a resource unit including a synchronization signal and a broadcast channel as a synchronization signal block, and make an initial access based on the SS block. The synchronization signal will be also referred to as a PSS and/or an SSS or an NR-PSS and/or an NR-SSS. The broadcast channel will be also referred to a PBCH or an NR-PBCH. The synchronization signal block will be also referred to as an SS Block (Synchronization Signal Block: SSB) or an SS/PBCH block.

The UE searches for a synchronization raster (sync raster) arranged at a given frequency position during the initial access. According to NR, a frequency position of an SS/PBCH block in a carrier is assumed to be arranged at other than a center, and therefore it is difficult to narrow down search candidate positions.

To reduce a search load of the synchronization raster, it has been considered to notify the UE of information related to a position of the synchronization raster than needs to be searched by using a code point of a given information element included in a synchronization signal block. On the other hand, what information is notified to the UE by using the code point of the given information element has not been sufficiently studied. There is a risk that, when the information to be notified to the UE is not appropriately configured, it is not possible to appropriately make the notification by using the code point, and a throughput lowers.

One of objects of the present disclosure is to provide a user terminal and a radio communication method that can appropriately perform notification control related to a synchronization raster position.

Solution to Problem

A user terminal according to one aspect of the present disclosure includes: a reception section that receives a synchronization signal block including a first information element related to a subcarrier offset, and a second information element related to a downlink control channel for system information; and a control section that, when a given code point is indicated in the first information element, recognizes an absence of a control resource set for the system information associated with the synchronization signal block, and determines an information type to be notified based on a code point included in the second information element.

Advantageous Effects of Invention

According to the present invention, it is possible to appropriately perform notification control related to a synchronization raster position.

BRIEF DESCRIPTION OF DRAWINGS

FIGS. 3A and 3B illustrate one example of a table that defines RMSI-PDCCH-Config associated with $k_{ssb}$, and offsets.

FIGS. 5A and 5B illustrate another example of a table that defines RMSI-PDCCH-Config associated with $k_{ssb}$, and offsets.

DESCRIPTION OF EMBODIMENTS

Figure 1:
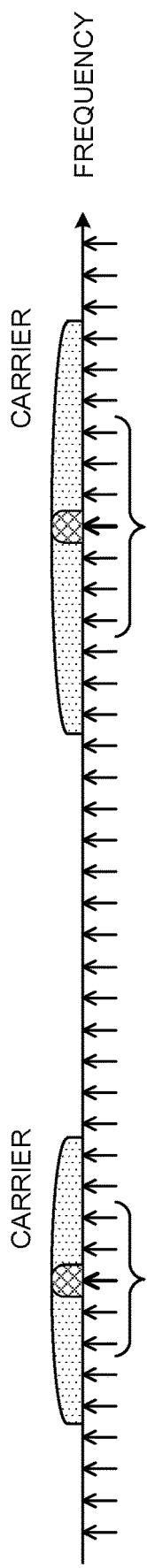
FIG. 1 is a diagram illustrating one example of SS search of a legacy LTE system.

It has been studied for future radio communication systems (e.g., LTE Rel. 14 or subsequent releases, 5G or NR) to define a signal block (also referred to as an SS block or an SS/PBCH block) including a synchronization signal (also referred to as an SS, a PSS and/or an SSS, or an NR-PSS and/or an NR-SSS) and a broadcast channel (also referred to as a broadcast signal, a PBCH or an NR-PBCH). An aggregation of one or more signal blocks is also referred to as a signal burst (also referred to as an SS/PBCH burst or an SS burst). A plurality of signal blocks in the signal burst are transmitted by different beams at different times (that is also referred to as beam sweep).

According to NR, a UE searches for (or monitors) a given frequency position when accessing (e.g., initial access) a network, and obtains an SS/PBCH block. Furthermore, according to NR, a plurality of the numbers of synchronization rasters (also referred to as sync rasters or Synchronization Signal (SS) rasters) that are frequency positions to be searched during the initial access are configured per band. For example, a plurality of the numbers of synchronization rasters are respectively configured at 0 to 2.65 GHz, 2.4 to 24.25 GHz and 24.25 to 100 GHz. In one example, it has been studied to configure 8832 synchronization rasters at 0 to 2.65 GHz, 15174 synchronization rasters at 2.4 to 24.25 GHz, and 4384 synchronization rasters at 24.25 to 100 GHz.

A Master Information Block (MIB) of Minimum System Information (MSI) read by the UE during the initial access is conveyed on the PBCH. The rest of the MSI is Remaining Minimum System Information (RMSI), and corresponds to a System Information Block (SIB) 1 and an SIB 2 according to LTE. Furthermore, a PDCCH indicated by the MIB schedules the RMSI.

For example, MIB content (information element) includes SystemFrameNumber (6 MSBs of SystemFrameNumber), subCarrierSpacingCommon, Ssb-subcarrierOffset, Dmrs-TypeA-Position, pdcchConfigSIB1, cellBarred, intraFreqReselection, spare, 4 LSBs of SystemFrameNumberm Ssb-IndexExplicit and Half-frame-index. Naturally, the contents of the MIB content is not limited to this.

An interpretation of part of the MIB content may differ according to which one of a first frequency range and a second frequency range higher than the first frequency range is used. For example, the first frequency range may be a frequency range lower than 6 GHz (sub-6), and the second frequency range may be a frequency range higher than 6 GHz (above-6). Furthermore, the first frequency range may be referred to as a Frequency Range (FR) 1. Furthermore, the second frequency range may be a frequency range higher than 24 GHz, and may be referred to as an FR 2, above-24 or a millimeter wave.

SystemFrameNumber notifies upper 6 bits of a System Frame Number (SFN). subCarrierSpacingCommon notifies a Sub-Carrier Spacing (an SCS or a numerology) for RMSI reception. Ssb-subcarrierOffset notifies a Physical Resource Block (PRB) grid offset for RMSI reception. Dmrs-TypeA-Position notifies whether a symbol position of a PDSCH DMRS is the third symbol or the fourth symbol in a slot. pdcchConfigSIB1 (that may be referred to as RMSI-PDCCH-Config) notifies a parameter set (PDCCH parameter set) of a PDCCH (or a Control Resource Set (CORESET) including the PDCCH or an RMSI CORESET) for RMSI reception. cellBarred notifies whether or not this cell can be camped on (resided) (Barred/notBarred). intraFreqReselection notifies whether or not there is a cell that can be camped on at an identical frequency (carrier band) (allowed/not allowed). spare is a spare bit, and is likely to be used for a specific purpose. 4 LSBs of SystemFrameNumber notifies lower 4 bits of the SFN.

At above-6, Ssb-IndexExplicit notifies upper 3 bits of an SSB index. At sub-6, 1 bit of Ssb-IndexExplicit is used together with Ssb-subcarrierOffset.

When a maximum number of the SSB indices is 64, 6 bits are necessary in some cases. There is a case at above-6 where the number of SSB indices is larger than 8, and, there is a case at sub-6 where the number of SSB indices is larger than 8. At sub-6, specific 1 bit of Ssb-IndexExplicit is used together with 4 bits of Ssb-subcarrierOffse to make Ssb-subcarrierOffset 5 bits. The lower 3 bits may be implicitly notified by using the PBCH DMRS.

Half-frame-index notifies whether this SSB is a 5 ms half frame of the first half or a 5 ms half frame of the second half of a radio frame (10 ms). CRC is a code of cyclic redundancy check generated based on the above information.

The number of necessary bits and the number of code points are determined for each MIB content in this way. For example, Ssb-subcarrierOffset indicates an offset between a PRB (the PRB for data) based on a center frequency of a carrier, and a PRB of the SSB as the number of subcarriers. When, for example, sub-carrier spacings of the SSB and the RMSI are identical, 1 PRB is 12 subcarriers, and therefore Ssb-subcarrierOffset uses 12 code points (a value of 0 to 11) of 4 bits.

Furthermore, bits and/or code points become spare in part of the MIB content in some cases. The code point is a value expressed as bits.

At, for example, sub-6, 1 bit of an information element (Ssb-IndexExplicit) associated with an index of the SS/PBCH block is used together with an information element (Ssb-subcarrierOffset) associated with a subcarrier offset of the SS/PBCH, and the rest of 2 bits become spare. Furthermore, at, for example, above-6, Ssb-subcarrierOffset uses 12 code points (a value of 0 to 11) out of 16 code points of 4 bits, and therefore at least 4 code points are not used. At sub-6, Ssb-subcarrierOffset uses up to 24 code points (a value of 0 to 23) out of 32 code points of 5 bits together with the 1 bit of Ssb-IndexExplicit, and therefore at least 8 code points are not used.

By the way, the legacy LTE system transmits a Cell-specific Reference Signal (CRS) in each subframe, and a synchronization signal is fixed to and arranged at a center of a carrier at all times. Hence, even when a data traffic does not occur, the UE can narrow down a frequency position for which SS search needs to be performed to some degree by referring to a spectrum of received power (see FIG. 1).

On the other hand, according to NR, it is possible to configure a long transmission periodicity of an SS/PBCH block used for an initial access. Furthermore, a frequency position of the SS/PBCH block in a carrier is arranged at other than a center. Therefore, there is a risk that narrowing down of search candidate positions that has been used by the legacy LTE system cannot be applied, and it is difficult to narrow down the search candidate positions compared to the legacy LTE system.

In this case, it is supposed to check a plurality of synchronization rasters one by one in order during the initial access. By, for example, sequentially searching for a plurality of SS rasters defined in advance by a specification, the UE can detect an accessible SS/PBCH block and make a random access based on RMSI associated with the SS/PBCH block.

However, when a plurality of synchronization rasters are searched in order, there may be also assumed a case where a time is required until an appropriate synchronization raster is detected. As a result, there is a risk that delay occurs during an access (e.g., initial access) to the network and/or consumption power increases.

To solve such a problem, it is supposed to use an information element (MIB content) of a PBCH included in an SS-PBCH block.

As described above, the UE searches for the SS/PBCH block on the synchronization raster during the initial access. To make the initial access, the UE needs to read RMSI (or an SIB) including information related to a Random Access Channel (RACH). Hence, an NR cell for Stadalone (SA) transmits the RMSI associated with the SSB for the SSB for the initial access.

On the other hand, there is a case where, for an SS/PBCH block that is not used for the initial access such as an SS/PBCH block of a cell (e.g., an NR cell for Non-Standalone (NSA) or an NSA cell) that is used only for a Secondary Cell (SCell), RMSI to be associated with this SS/PBCH block is absent. cellBarred is Barred in the SS/PBCH block of the NSA cell, and, when cells in a carrier of this SS/PBCH block are all NSA cells, intraFreqReselection is not allowed.

In the SS/PBCH block in which associated RMSI is absent, an information element used for RMSI reception is not used. The information element used for RMSI reception is, for example, an information element (pdcchConfigSIB1) used for notifying a PDCCH configuration, and an information element (Ssb-subcarrierOffset) used for notifying a PRB grid offset for RMSI reception.

Hence, information for notifying the presence or the absence of the associated RMSI is defined for an unused code point of a given information element (e.g., Ssb-subcarrierOffset) included in the PBCH. When the absence of the RMSI associated with Ssb-subcarrier-offset (no associated RMSI) is notified, bits (e.g., 8 bits) of an information element (pdcchConfigSIB1) used for notifying the PDCCH configuration for RMSI reception can be used for other usages.

Figure 2:
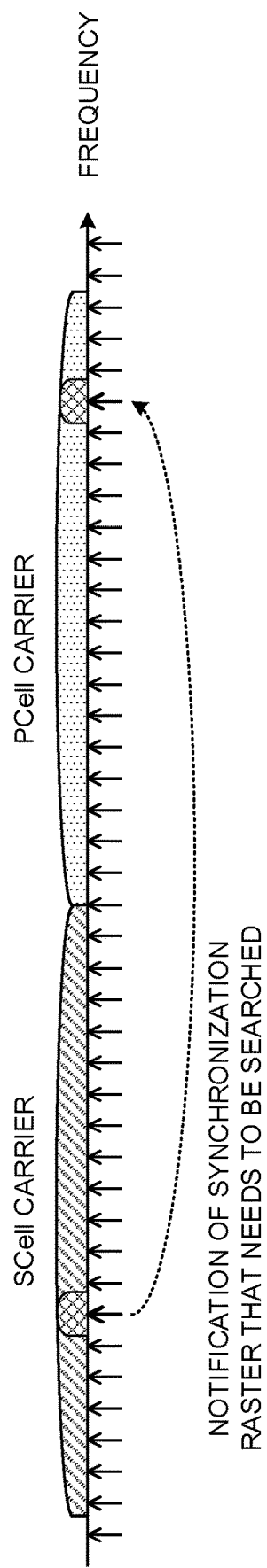
FIG. 2 is a diagram illustrating one example of a case where a synchronization raster that is detected next is notified by an SS/PBCH block.

Hence, it is supposed to use this pdcchConfigSIB1 (RMSI-PDCCH-Config) to notify information related to a synchronization raster that the UE needs to search next. That is, an SS/PBCH block (e.g., the SS/PBCH block for the SCell) that is arranged on the synchronization raster and does not support an initial access is used to notify the UE of information (e.g., an SS/PBCH block for the PCell) related to the synchronization raster that needs to be searched next (see FIG. 2). That is, the UE decides the synchronization raster that needs to be searched next by using an unused code point of Ssb-subcarrierOffset and pdcchConfigSIB1.

At, for example, sub-6 (FR 1), a value (e.g., $k_{ssb}$>23) larger than a given value out of 32 code points ($k_{ssb}$=0 to 31) of 5 bits of Ssb-subcarrierOffset (including 1 bit of Ssb-IndexExplicit) is notified to the UE. In this case, the UE decides the absence of a control resource set for a given search space, and searches for a synchronization raster based on an offset configured in association with each $k_{ssb}$ (see FIG. 3A).

FIG. 3A illustrates one example of a table that defines RMSI-PDCCH-Config (pdcchConfigSIB1) associated with each $k_{ssb}$ (e.g., $k_{ssb}$=23 to 30) and an offset associated with this RMSI-PDCCH-Config. In addition, $k_{ssb}$=30 corresponds to a reserved bit with an offset undefined.

Furthermore, at above-6 (FR 2), a value (e.g., $k_{ssb}$>11) larger than a given value out of 16 code points ($k_{ssb}$=0 to 15) of 4 bits of Ssb-subcarrierOffset is notified to the UE. In this case, the UE decides the absence of a control resource set for a given search space, and searches for a synchronization raster based on an offset configured in association with each $k_{ssb}$ (see FIG. 3B). In addition, $k_{ssb}$=14 corresponds to a reserved bit with an offset undefined.

Figure 4:
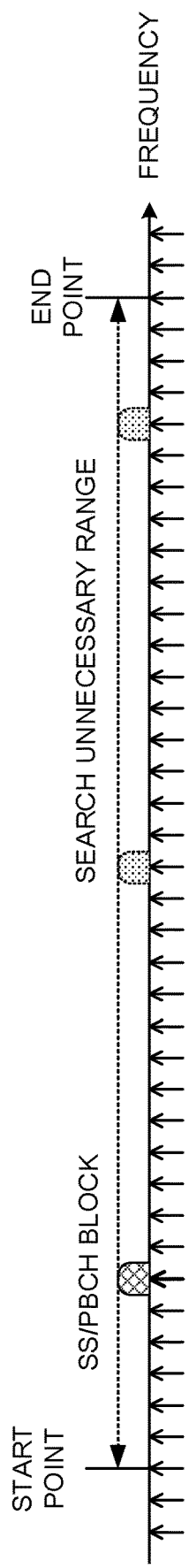
FIG. 4 is a diagram illustrating one example of a case where a range of a synchronization raster that is not detected is notified by the SS/PBCH block.

On the other hand, there is also assumed a case where, when a synchronization raster (e.g., an SSB matching an initial access) that needs to be detected next is notified by using a bit included in pdcchConfigSIB1, there is not a synchronization raster position within a frequency range that can be indicated by this bit. A specific code point of Ssb-subcarrierOffset may be notified, and a search unnecessary synchronization raster range may be notified by using 8 bits of RMSI-PDCCH-Config (pdcchConfigSIB1) (see FIG. 4).

By, for example, using $k_{ssb}$=31 at sub-6 (FR 1) and $k_{ssb}$=15 at above-6 (FR 2), the search unnecessary synchronization raster range may be notified. When, for example, being notified of $k_{ssb}$=31, the UE may decide a start of the search unnecessary synchronization raster range by using 4 bits of the first half out of 8 bits associated with each $k_{ssb}$, and decide an end of the search unnecessary synchronization raster range by using 4 bits of the second half.

Thus, it is possible to notify the UE of whether a CORESET for RMSI associated an SSB (e.g., the CORESET for a type 0-PDCCH common search space) is present or absent based on $k_{ssb}$ to be notified on a PBCH. When being notified of the absence of the CORESET for RMSI, the UE decides one of a synchronization raster position (GSCN) that needs to be searched next or the search unnecessary synchronization raster range based on notified $k_{ssb}$.

Currently, there is employed a configuration, when the absence of the CORESET for RMSI is notified, information related to a synchronization raster is also concurrently notified (e.g., $k_{ssb}$=23 to 29 at the FR 1 or $k_{ssb}$=12 to 13 at the FR 2).

On the other hand, a case is also assumed where, when the CORESET for RMSI is absent, the information related to the synchronization raster does not particularly need to be notified to the UE. For example, the UE that operates non-standalone is connected with a cell different from a cell to access, and therefore may not necessarily obtain the information related to the synchronization raster.

Hence, the inventors of this application have focused on $k_{ssb}$ ($k_{ssb}$=30 at the FR 1 or $k_{ssb}$=14 at the FR 2) to which an entry (reserved bit) to be reserved is configured in FIGS. 3A and 3B as a method for not notifying the information related to the synchronization raster. By, for example, notifying the UE of $k_{ssb}$=30 (or $k_{ssb}$=14) and not notifying the information related to the synchronization raster, it is possible to notify the absence of the CORESET for RMSI.

However, when $k_{ssb}$=30 or $k_{ssb}$=14 in FIG. 3 is used, 8 bits of RMSI-PDCCH-Config (pdcchConfigSIB1) is not used. The inventors of this application have focused on a reserved bit of $k_{ssb}$=30 or $k_{ssb}$=14, and conceived notifying the absence of the CORESET for RMSI by using the reserved bit, and notifying the UE of given information.

An embodiment according to the present invention will be described in detail below with reference to the drawings. Each aspect may be applied alone or may be applied in combination. Furthermore, the aspects described below may be applied not only to non-standalone but also to standalone.

First Aspect

According to the first aspect, when a given code point is indicated in a first information element, the absence of a control resource set for system information associated with a synchronization signal block is recognized, and an information type to be notified is determined based on a code point included in a second information element.

An example of a case where the first information element is an information element (e.g., Ssb-subcarrierOffset) related to an subcarrier offset, and the second information element is an information element (e.g., RMSI-PDCCH-Config or pdcchConfigSIB1) related to a downlink control channel for the system information will described below. Naturally, the first information element and the second information element are not limited to these. Other information elements included in a synchronization signal block (that may be referred to as an SS block or an SS/PBCH block) may be used.

A case is assumed where a given code point (e.g., $k_{ssb}$=30 (FR 1) or $k_{ssb}$=14 (FR 2)) is indicated in the first information element (also referred to as Ssb-subcarrierOffset below).

When a specific code point is indicated in the second information element (also referred to as RMSI-PDCCH-Config below), the UE recognizes the absence of a CORESET for RMSI associated with the detected SS block. Furthermore, the UE may recognize that information related to a synchronization raster position that needs to be searched next, and a search unnecessary synchronization raster range is not included. The specific code point in the second information element may be, for example, "00000000" (in a case of 8 bits).

On the other hand, when a code point other than the specific code point is indicated in the second information element (also referred to as RMSI-PDCCH-Config below), the UE recognizes the absence of the CORESET for RMSI associated with the detected SS block. Furthermore, the UE may decide that second information different from first information notified by RMSI-PDCCH-Config when $k_{ssb}$ other than $k_{ssb}$=30 (FR 1) or $k_{ssb}$=14 (FR 2) is indicated is notified.

The code point other than the specific code point in the second information element may be, for example, "00000001 to 11111111" (in a case of 8 bits).

The second information may have contents different from that of the first information, and may be information that indicates a range that does not overlap a range indicated by the first information. For example, the second information may define a range that does not overlap a range of an offset (e.g., $N^{offset}_{GSCN}$) notified by the first information.

In one example, by using the second information, at least one of an offset value larger than 769 and an offset value smaller than −769 may be notified at the FR 1, and at least one of an offset value larger than 256 and an offset value smaller than −256 may be notified at the FR 2. Consequently, it is possible to indicate a wider range as a synchronization raster search position to the UE.

Alternatively, information other than information related to a synchronization raster position that needs to be searched next may be notified by using the second information.

Thus, when detecting an SS block whose $k_{ssb}$ is a given value (e.g., 30 at the FR 1 or 14 at the FR 2) and whose RMSI-PDCCH-Config is 0, the UE may decide the absence of a next SS block including a control resource set for a type 0-PDCCH common search space in a cell associated with the detected SS block. Alternatively, when detecting an SS block whose $k_{ssb}$ is the given value (e.g., 30 at the FR 1 or 14 at the FR 2) and whose RMSI-PDCCH-Config is 0, the UE may decide for the detected SS block that there is not information related to the next SS block including the control resource set for the type 0-PDCCH common search space.

According to the above configuration, it is possible not to make a notification related to a synchronization raster in an SS block (e.g., a non-standalone SS block), and it is possible to notify other information by using a bit in an SS block (e.g., PBCH). Particularly, an information amount that can be notified on the PBCH (e.g., MIB) is limited, so that, by effectively using 8 bits of RMSI-PDCCH-Config, it is possible to use the MIB and notify effective information.

In addition, a value of an offset (e.g., $N^{offset}_{GSCN}$) may be defined for a given code point (e.g., 0) of RMSI-PDCCH-Config associated with a given value of $k_{ssb}$ (e.g., $k_{ssb}$=30 at the FR 1 or $k_{ssb}$=14 at the FR 2), and a reserved bit may be defined for other code points (see FIG. 5).

FIG. 5A corresponds to a table for the FR 1, and illustrates that, in a case of $k_{ssb}$=30, an offset associated with the given code point (e.g., 0) of RMSI-PDCCH-Config is configured to 0, and offsets associated with other code points (e.g., 1 to 255) are configured to reserved. Furthermore, FIG. 5B corresponds to a table for the FR 2, and illustrates that, in a case of $k_{ssb}$=14, an offset associated with the given code point (e.g., 0) of RMSI-PDCCH-Config is configured to 0, and offsets associated with other code points (e.g., 1 to 255) are configured to reserved. Consequently, it is possible to flexibly notify other information by using a reserved bit in the future when needed.

Second Aspect

According to the second aspect, when a code point for notifying a search unnecessary synchronization raster range is indicated in a first information element, it is decided that information related to the search unnecessary synchronization raster range is not included according to a code point notified by a second information element.

A case is assumed where a given code point ($k_{ssb}$=31 (FR 1) or $k_{ssb}$=15 (FR 2)) is indicated in the first information element (also referred to as Ssb-subcarrierOffset below). The given code point corresponds to a code point used to notify the search unnecessary synchronization raster range.

When a specific code point is indicated in the second information element (also referred to as RMSI-PDCCH-Config below), a UE recognizes the absence of a CORESET for RMSI associated with a detected SS block. Furthermore, the UE may recognize that there is no information related to a synchronization raster position that needs to be searched next, and the search unnecessary synchronization raster range. The specific code point in the second information element may be, for example, "00000000" (in a case of 8 bits).

On the other hand, when a code point other than the specific code point is indicated in the second information element (also referred to as RMSI-PDCCH-Config below), the UE recognizes the absence of the CORESET for RMSI associated with the detected SS block. Furthermore, the UE may decide the search unnecessary synchronization raster range based on the indicated code point.

When the specific code point is indicated in RMSI-PDCCH-Config, the UE may recognize a start ($N^{offset}_{start}$) and an end ($N^{offset}_{end}$) of an offset. In this case, the UE may recognize the absence of an SS block including the CORESET for associated RMSI on a synchronization raster ($N^{reference}_{GSCN}$) including the detected SS block. In this case, the UE may recognize that intra-frequency reselection is not allowed (corresponding to intraFreqReselection=not allowed).

In this regard, when notification contents of intra-frequency reselection (intraFreqReselection) notified by a PBCH (e.g., MIB) is different, the UE may perform control to prioritize one of notifications (e.g., a notification by the MIB), and ignore the other notification. Consequently, even if the notification contents differs, it is possible to appropriately continue communication.

Thus, by using a code point used for notifying the search unnecessary synchronization raster range and notifying that the information related to the synchronization raster is not notified, it is possible to use for other usages all code points notified by RMSI-PDCCH-Config when $k_{ssb}$=30 (FR 1) or $k_{ssb}$=14 (FR 2) is indicated.

Variation

It is also assumed that a given release (e.g., Rel. 15) makes it possible to notify that information related to a synchronization raster position that is searched next and a search unnecessary synchronization raster range is not included by using a specific code point of RMSI-PDCCH-Config, and an interpretation of the rest of code points of RMSI-PDCCH-Config in a case where $k_{ssb}$=30 (FR 1) or $k_{ssb}$=14 (FR 2) is indicated is defined in a future release (e.g., Rel. 16 or subsequent releases).

In this case, UE capability information related to whether or not it is possible to interpret the rest of code points of RMSI-PDCCH-Config in a case where $k_{ssb}$=30 (FR 1) or $k_{ssb}$=14 (FR 2) is indicated is defined together with contents of the code points in the future release.

(Radio Communication System)

The configuration of the radio communication system according to one embodiment of the present invention will be described below. This radio communication system uses one or a combination of the radio communication method according to each of the above embodiment of the present invention to perform communication.

Figure 6:
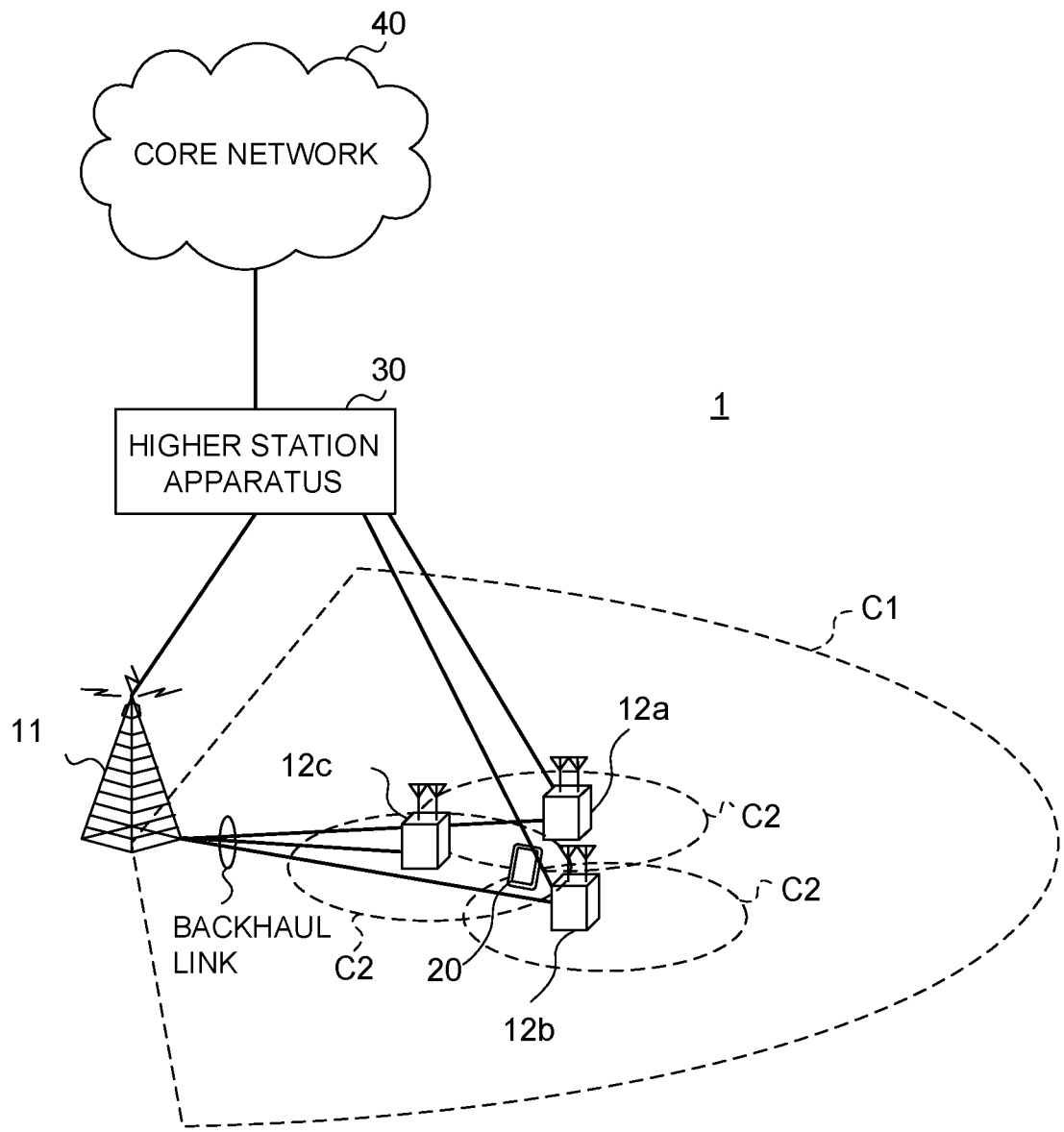
FIG. 6 is a diagram illustrating one example of a schematic configuration of a radio communication system according to one embodiment of the present invention.

FIG. 6 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to those illustrated in FIG. 6.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 7:
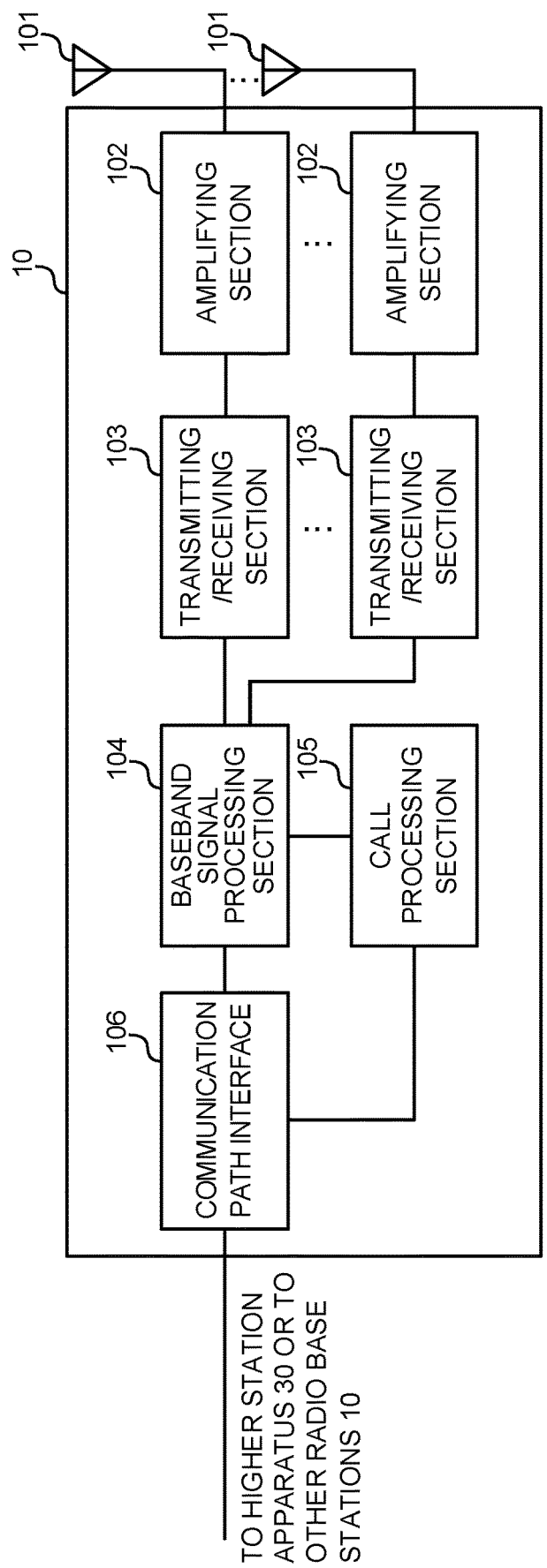
FIG. 7 is a diagram illustrating one example of an overall configuration of a radio base station according to the one embodiment of the present invention.

FIG. 7 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmission section 103 transmits a synchronization signal block including the first information element (e.g., Ssb-subcarrierOffset) related to a subcarrier offset, and the second information element (e.g., RMSI-PDCCH-Config or pdcchConfigSIB1) related to a downlink control channel for system information.

Figure 8:
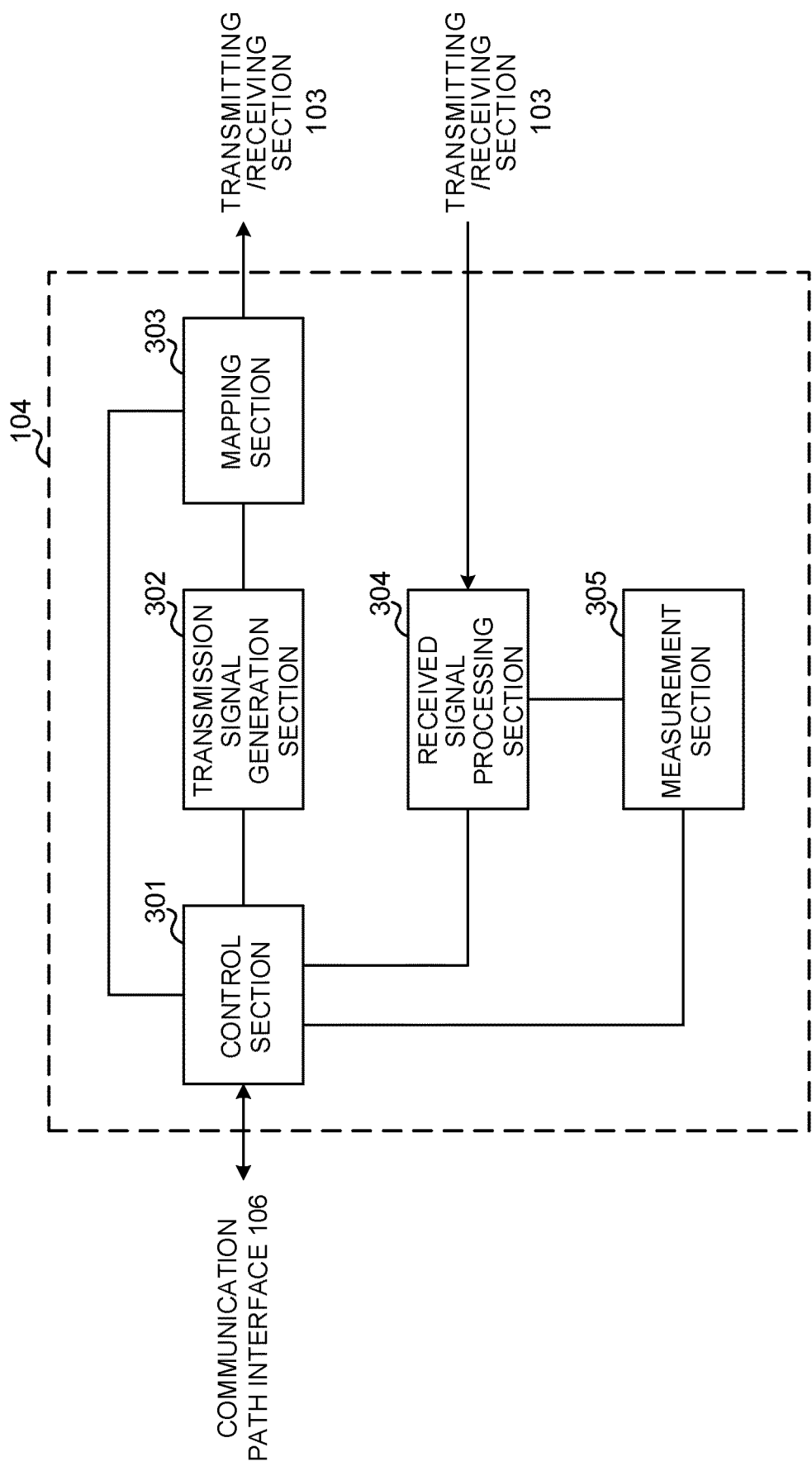
FIG. 8 is a diagram illustrating one example of a function configuration of the radio base station according to the one embodiment of the present invention.

FIG. 8 is a diagram illustrating one example of a function configuration of the radio base station according to the one embodiment of the present invention. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

Furthermore, the control section 301 performs control to notify at least one of whether or not a synchronization raster is searched, a search range and a search unnecessary range by using the code points of the first information element (e.g., Ssb-subcarrierOffset) and the second information element (e.g., RMSI-PDCCH-Config or pdcchConfigSIB1).

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a given radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 9:
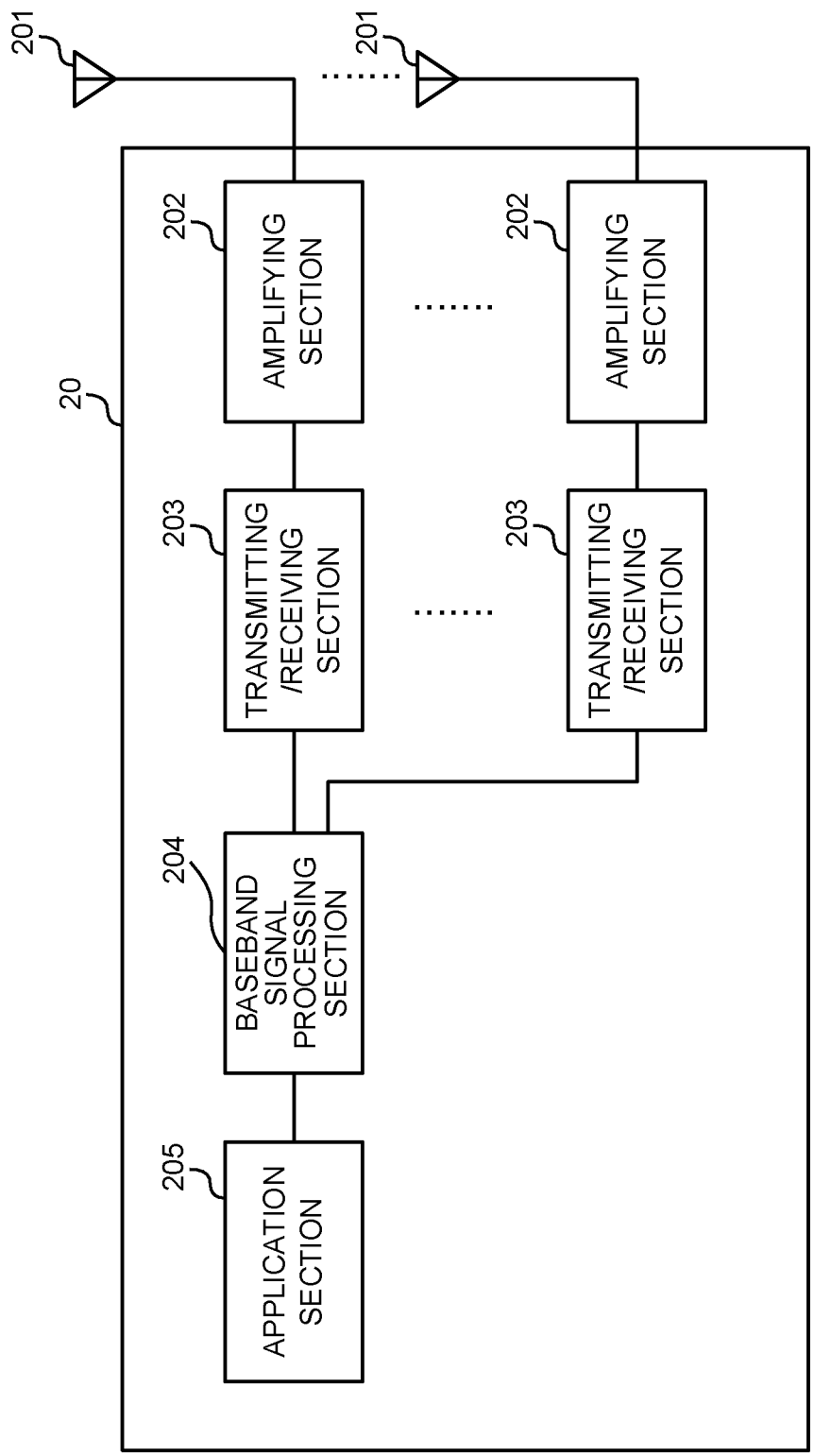
FIG. 9 is a diagram illustrating one example of an overall configuration of a user terminal according to the one embodiment of the present invention.

FIG. 9 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives a synchronization signal block including the first information element (e.g., Ssb-subcarrierOffset) related to the subcarrier offset, and the second information element (e.g., RMSI-PDCCH-Config or pdcchConfigSIB1) related to the downlink control channel for the system information.

Figure 10:
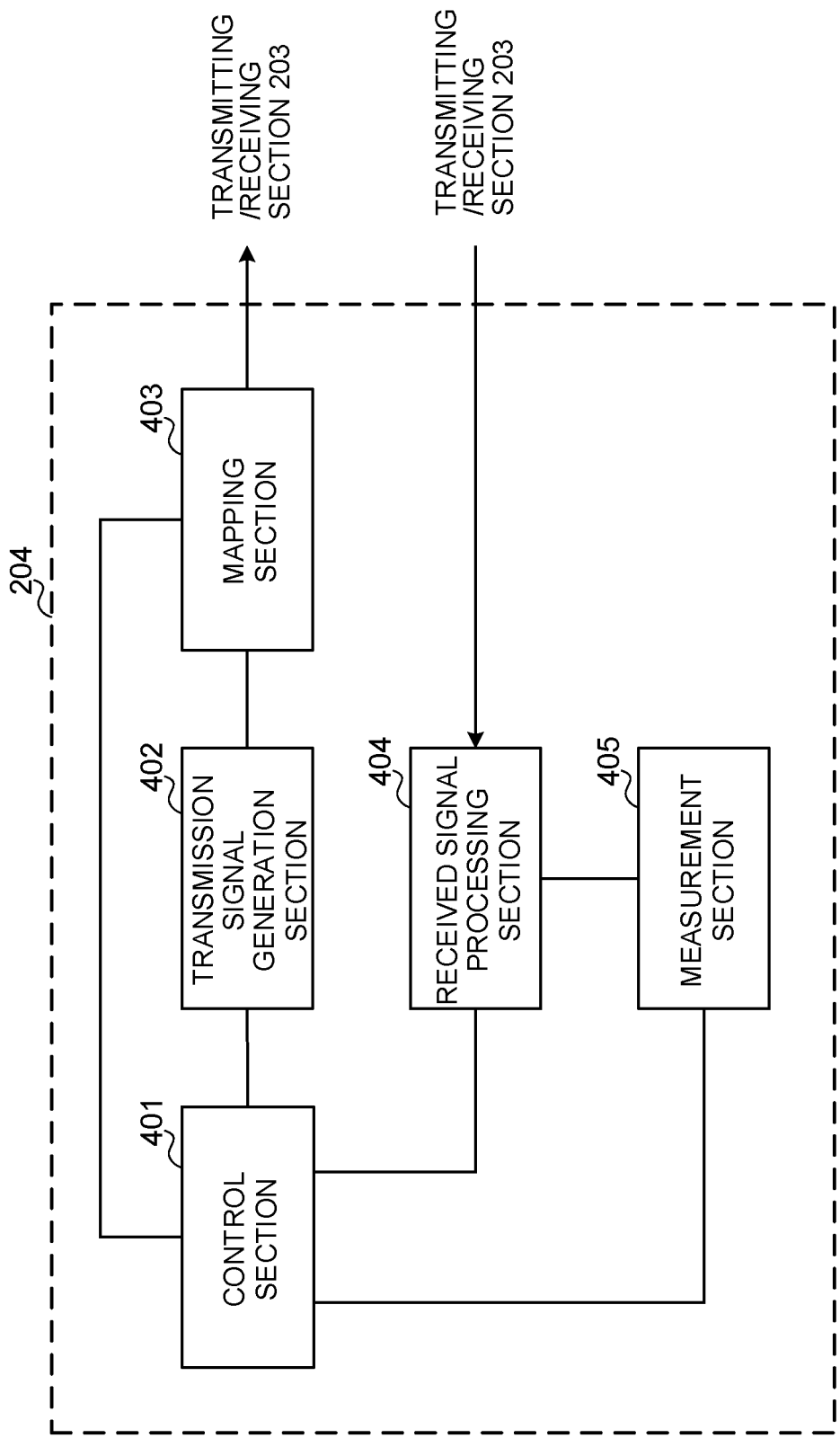
FIG. 10 is a diagram illustrating one example of a function configuration of the user terminal according to the one embodiment of the present invention.

FIG. 10 is a diagram illustrating one example of a function configuration of the user terminal according to the one embodiment of the present invention. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

Furthermore, when the given code point (e.g., $k_{ssb}=30$ (FR 1) or $k_{ssb}=14$ (FR 2)) is indicated in the first information element (e.g., Ssb-subcarrierOffset), the control section 401 recognizes the absence of a control resource set for system information associated with a synchronization signal block, and determines an information type notified based on the code point (e.g., 8 bits are used) included in the second information element (e.g., RMSI-PDCCH-Config).

Furthermore, when a first code point (e.g., 00000000) is indicated in the second information element, the control section 401 may decide that information related to a synchronization raster position that needs to be searched and a search unnecessary synchronization raster range is not included.

Furthermore, when a code point other than the first code point is indicated in the second information element, the control section 401 may decide that information different from information notified by the second information element when the code point (e.g., $k_{ssb}=24$ to 29 (FR 1) or $k_{ssb}=12$ to 13 (FR 2)) other than the given code point is indicated in the first information element is notified.

A given offset with respect to the synchronization raster position may be defined for the first code point in the second information element, and reserved bits may be configured to code points other than the first code point.

Furthermore, when a code point (e.g., $k_{ssb}=31$ (FR 1) or $k_{ssb}=15$ (FR 2)) for notifying the search unnecessary synchronization raster range is indicated in the first information element, and a second code point (e.g., 00000000) is indicated in the second information element, the control section 401 may decide that the information related to the search unnecessary synchronization raster range is not included.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 11:
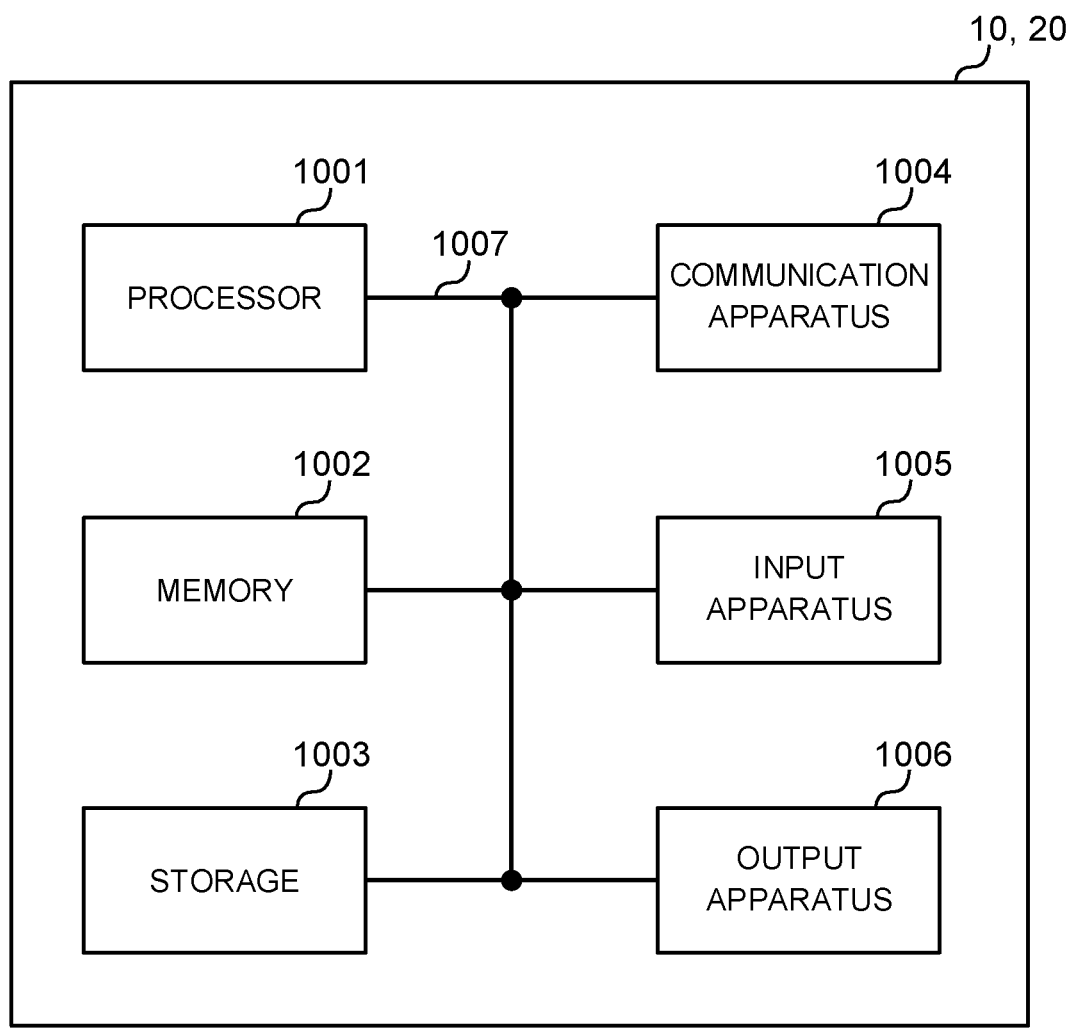
FIG. 11 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 11 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates the only one processor 1001. However, there may be a plurality of processors. Furthermore, processing may be executed by one processor or processing may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

(Modified Example) In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TT's (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information). Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of the physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description intends for exemplary explanation, and does not bring any restrictive meaning to the present invention.

The invention claimed is:

1. A terminal comprising:
a receiver that receives a first synchronization signal/physical broadcast channel (SS/PBCH) block indicating a first information element regarding a subcarrier offset and a second information element regarding a downlink control channel for a system information; and
a processor that, when a specific value is indicated in the first information element, determines start and finish positions of a range in which a second SS/PBCH block is not present when bits included in the second information element are first bit values, and determines that there is no information for the second SS/PBCH block associated with a control resource set for Type0-physical downlink control channel (PDCCH) common search space (CSS) set when bits included in the second information element are second bit values.

2. The terminal according to claim 1, wherein the second bit values correspond to a case when offsets that determine the start and finish positions of the range are zero.

3. The terminal according to claim 1, wherein the second bit values are all zero and the first bit values are not zero.

4. The terminal according to claim 2, wherein the second bit values are all zero and the first bit values are not zero.

5. The terminal according to claim 1, wherein, when the second bit values are received by the receiver, the processor determines that there is no information for the second SS/PBCH block with a control resource set for the Type0-PDCCH CSS set in the first SS/PBCH block.

6. The terminal according to claim 2, wherein, when the second bit values are received by the receiver, the processor determines that there is no information for the second SS/PBCH block with a control resource set for the Type0-PDCCH CSS set in the first SS/PBCH block.

7. The terminal according to claim 3, wherein, when the second bit values are received by the receiver, the processor determines that there is no information for the second SS/PBCH block with a control resource set for the Type0-PDCCH CSS set in the first SS/PBCH block.

8. The terminal according to claim 1, wherein the specific value is equal to 31 for a first frequency band or the specific value is equal to 15 for a second frequency band.

9. The terminal according to claim 2, wherein the specific value is equal to 31 for a first frequency band or the specific value is equal to 15 for a second frequency band.

10. The terminal according to claim 3, wherein the specific value is equal to 31 for a first frequency band or the specific value is equal to 15 for a second frequency band.

11. The terminal according to claim 5, wherein the specific value is equal to 31 for a first frequency band or the specific value is equal to 15 for a second frequency band.

12. The terminal according to claim 1, wherein when the specific value is equal to 30 for a first frequency band or when the specific value is equal to 14 for a second frequency band, bit values indicated by the second information element correspond to a reserved bit.

13. A radio communication method comprising:
receiving a first synchronization signal/physical broadcast channel (SS/PBCH) block indicating a first information element regarding a subcarrier offset and a second information element regarding a downlink control channel for a system information; and
when a specific value is indicated in the first information element, determining start and finish positions of a range in which a second SS/PBCH block is not present when bits included in the second information element are first bit values, and
when the specific value is indicated in the first information element, determining that there is no information for the second SS/PBCH block associated with a control resource set for Type0-physical downlink control channel (PDCCH) common search space (CSS) set when bits included in the second information element are second bit values.

14. A base station comprising:
a transmitter that transmits a first synchronization signal/physical broadcast channel (SS/PBCH) block indicating a first information element regarding a subcarrier offset and a second information element regarding a downlink control channel for a system information; and
a processor that, when a specific value is indicated in the first information element, notifies start and finish positions of a range in which a second SS/PBCH block is not present when bits included in the second information element are first bit values, and notifies that there is no information for the second SS/PBCH block associated with a control resource set for Type0-physical downlink control channel (PDCCH) common search space (CSS) set when bits included in the second information element are second bit values.

15. A system comprising a terminal and a base station:
the terminal comprising:
a receiver that receives a first synchronization signal/physical broadcast channel (SS/PBCH) block indicating a first information element regarding a subcarrier offset and a second information element regarding a downlink control channel for a system information; and
a first processor that, when a specific value is indicated in the first information element, determines start and finish positions of a range in which a second SS/PBCH block is not present when bits included in the second information element are first bit values, and determines that there is no information for the second SS/PBCH block associated with a control resource set for Type0-physical downlink control channel (PDCCH) common search space (CSS) set when bits included in the second information element are second bit values, and
the base station comprising:
a transmitter that transmits the first SS/PBCH block; and
a second processor that, when the specific value is indicated in the first information element, notifies start and finish positions of a range in which a second SS/PBCH block is not present when bits included in the second information element are first bit values, and notifies that there is no information for the second SS/PBCH block associated with the control resource set for Type0-PDCCH CSS set when bits included in the second information element are second bit values.

\* \* \* \* \*